Patented Dec. 16, 1947

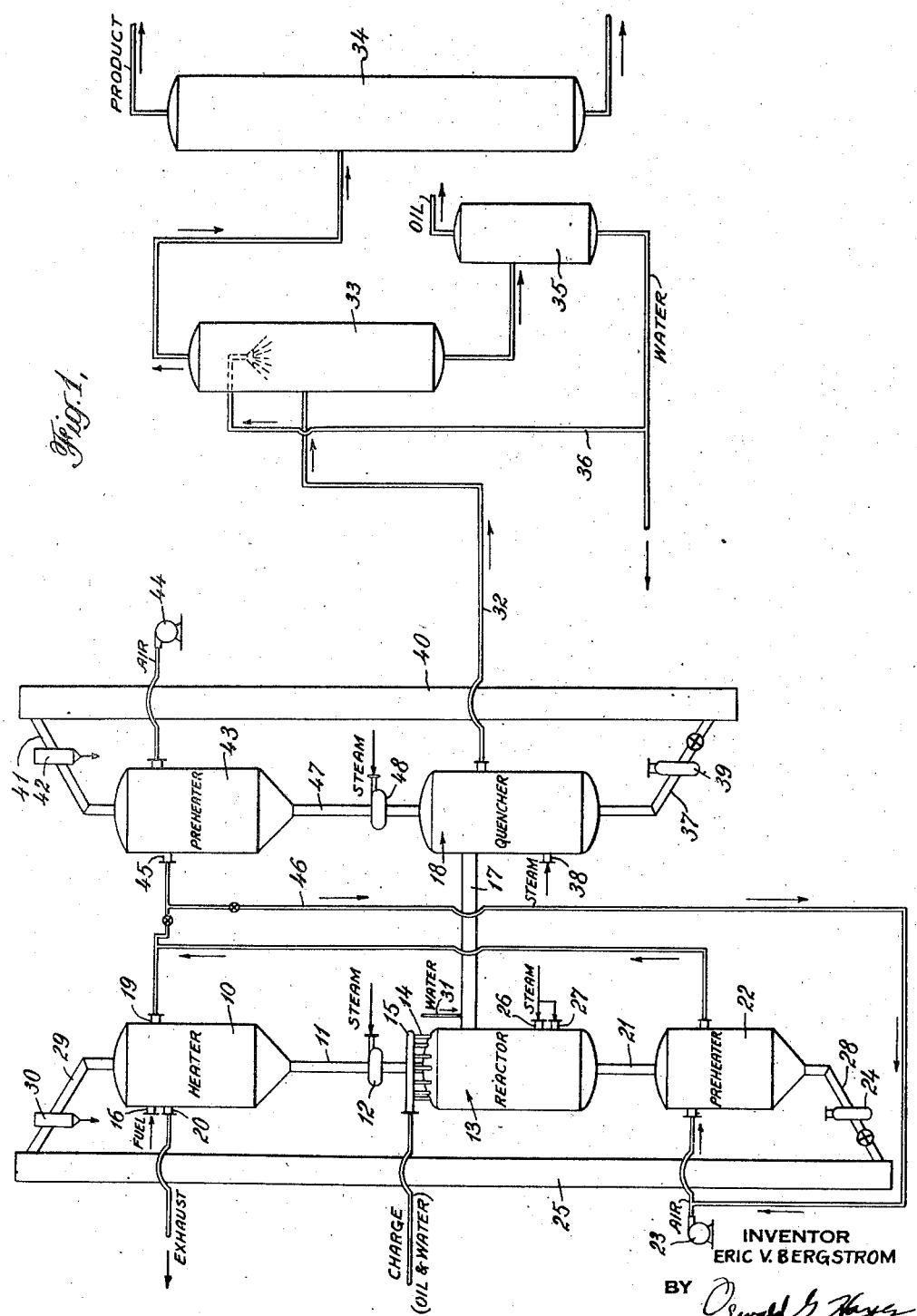

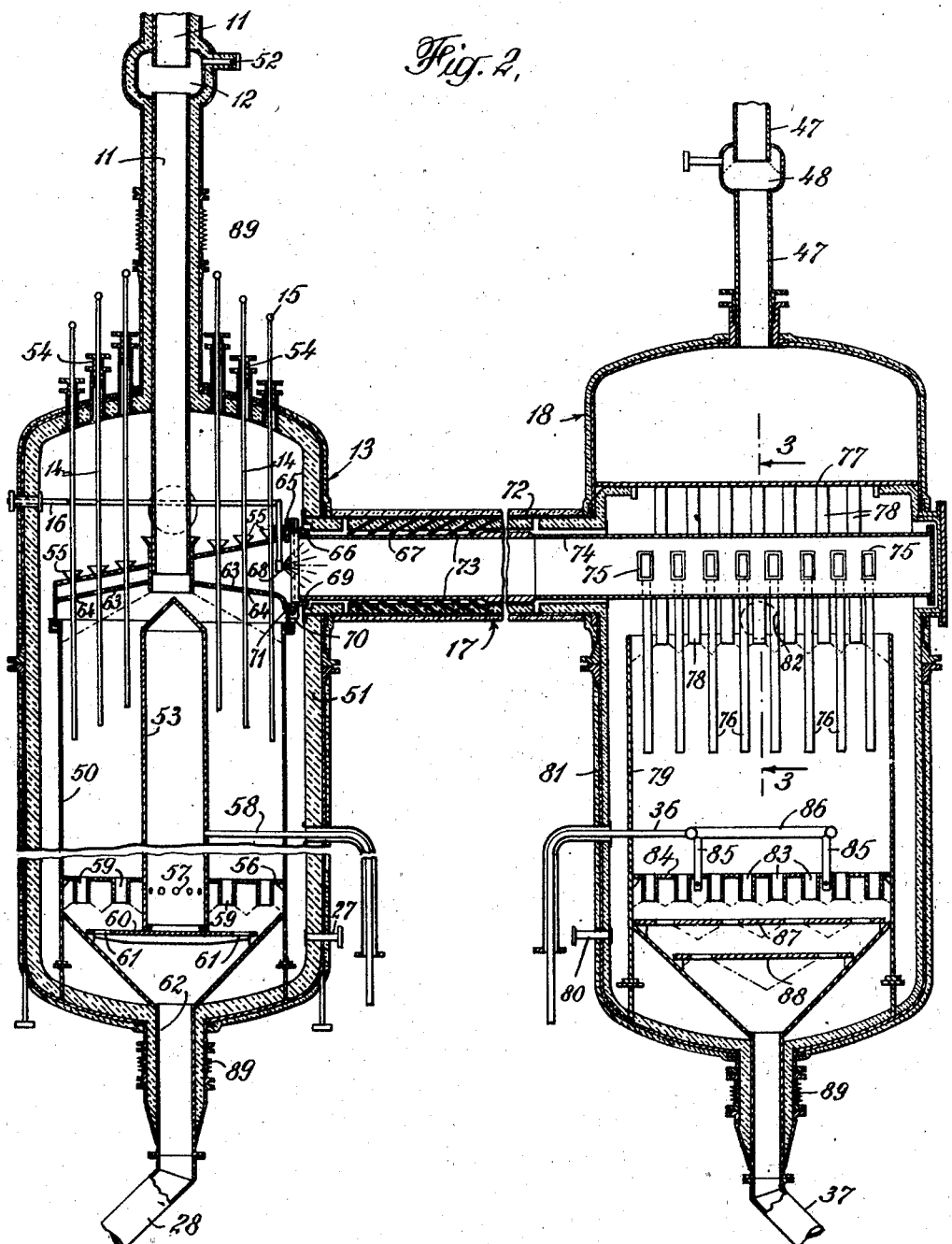

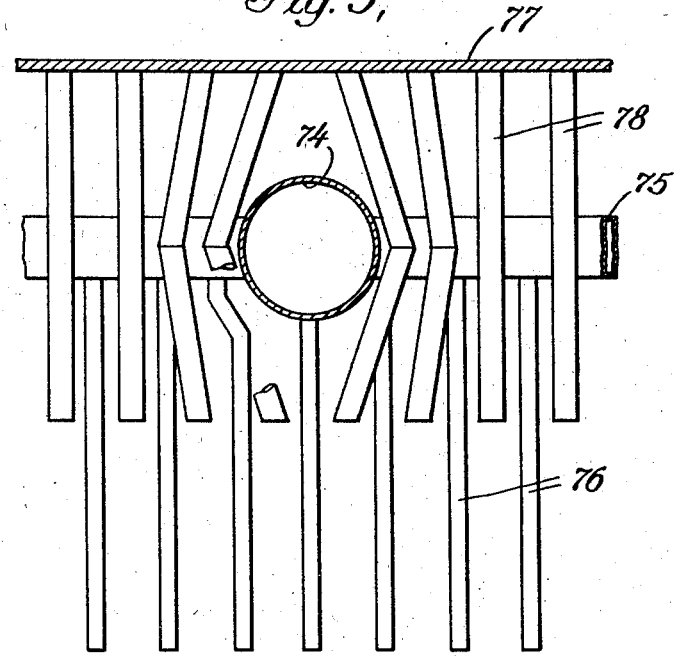
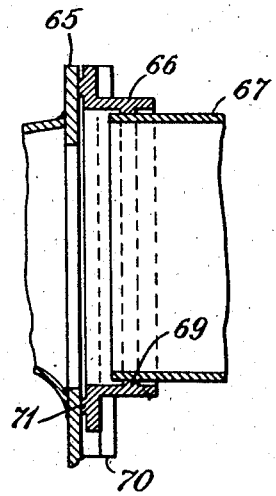

2,432,962

UNITED STATES PATENT OFFICE 2,432,962

PROCESS FOR HEATING HYDROCARBONS BY CONTACT WITH A MOVING GRANULAR SOLID

Eric V. Bergstrom, Short Hills, N. J., assignor to Socony-Vacuum Oil Company, Incorporated, a corporation of New York Application June 20, 1946, Serial No. 678,141

1 Claim. (Cl. 196—55)

This invention relates to a continuous process for heating a granular solid to an elevated temperature and thereafter contacting a reactant mixture with said highly heated solid to induce the desired reaction. More particularly the invention is concerned with method and apparatus whereby residual heat content in the granular solid withdrawn from the reaction zone is utilized to preheat air for generation of a flame to heat the granular solid.

The invention is particularly well adapted to use in processes requiring a high reaction temperature for a short reaction time, as for example, in the cracking of heavier hydrocarbons to produce ethylene at temperatures on the order of 1500° F. In such reactions the reactant fluid must be heated very rapidly to the desired temperature and, after a suitable short reaction time, be rapidly cooled to inhibit further reaction. This result is readily obtained by passing the reactant in direct contact with a compact moving bed of highly heated granular solid, and then quenching the reaction mixture to a temperature below that at which further reaction takes place. In the absence of such quenching, secondary reactions occur which seriously reduce the yield of desired primary products. Thus, in crack'ng to produce ethylene, high yields are obtained at 1500° F. from gas oil when the mean effective reaction time is held to a fraction of a second, say 0.2 second.

Reactions of the type discussed above can be carried out in apparatus consisting primarily of a heater and a reactor directly therebelow and joined thereto by a conduit for transferring highly heated solid from the heater to the reactor. To achieve continuity of operation, the cooled solid is recycled from the bottom of the reactor to the top of the heater to again pass through the two chambers in series. As a practical matter, the temperature of the recycled solid should be considerably below the reaction temperature to avoid damaging of the elevator structure. According to the present invention the granular solid is cooled to a suitably low temperature, say 900° F. and preheated air is generated for use in the heater by passing a current of air in direct contact with the hot solids in a zone below the reactor and prior to entering the elevator.

This concept can also be combined with that of a second cyclic system containing granular solid employed for quenching the reaction vapors from the reaction zone. In this second cycle, a granular solid is passed as compact moving beds through a zone in which it contacts a stream of air or other cooling medium and a zone wherein it contacts hot reaction products from the reactor. The zone in which the granular solid is cooled may be used to preheat air for the heater in the reaction cycle and, in a preferred embodiment of this invention air is passed in series through a preheater which serves to cool the quenching solid, thence through a second preheater which serves to cool solids from the reactor before delivery to the elevator feeding the heater. The air which has been so preheated by passage through two preheaters in series is then utilized for generation of a high temperature flame which heats granular solid in the heater.

These and other objects and advantages of the invention will be apparent from study of apparatus shown in the annexed drawings; wherein Figure 1 is a diagrammatic representation of apparatus for conducting the process;

Figure 2 is a vertical section through the reactor and quencher showing the interior structure thereof and the nature of the connecting conduit;

Figure 3 is a section on line 3—3 of Figure 2; and

Figure 4 is a detail view in section of the outlet connection of the reactor.

As shown in Figure 1, a preferred embodiment of the invention utilizes two independent cycles of granular solid, utilized respectively for heating and quenching the charge material such as gas oil to be converted to large yields of ethylene at 1500° F. It will be understood that many of the important advantages of the invention may be obtained in a system wherein the two cycles share the same path for a portion of the solids travel therein. A single elevator may be used with division of the elevator discharge into two streams for separate passage downwardly through the reaction and quenching zones. According to the present embodiment, a compact moving bed of granular solid passes downwardly through a heater 10 wherein it is raised to an elevated temperature by a flame generated therein by combustion of fuel and air supplied at inlets 16 and 19 respectively. A flue gas is withdrawn at 20 and passed to a suitable stack or economizer. The granular solid at elevated temperature (say 1575° F.) passes downwardly through a feed leg 11 provided with a steam sealing zone 12 to a reactor 13. A charge for the process enters the reactor by a plurality of pipes 14 from one or more manifolds 15 to be introduced into a moving bed of hot solids in reactor 13. Steam is found to have a beneficial effect on the conversion of hydrocarbon oil to ethylene and the charge preferably consists of a mixture of oil and water which may be either in liquid or in vapor phase.

The solids, which have been cooled somewhat, pass downwardly through reactor 13 and are purged with steam admitted at 26 and passed by feed leg 21 to a preheater 22. A second portion of steam is admitted at 27 to the reactor 13 as a pressuring medium as described hereinafter. Air is passed in contact with the solids in preheater 22 either from a compressor 23 or from a first stage preheater as hereinafter described. The granular solids are then transferred by a conduit 28 through a depressuring pot 24 to elevator 25 which returns them to the top of the cycle to pass through a conduit 29 through a classifying device 30 for removal of fines to the heater 10.

Returning now the reactor 13, hot gaseous products of the reaction are preliminarily quenched with water admitted at 31 and then transferred by line 17 to the quencher 18 wherein the temperature of the product is further reduced by contact with a relatively cold granular solid and then conducted by line 32 to a spray condenser 33 from which the product is withdrawn at a temperature of about 100° F. to suitable fractionation and purification equipment indicated by the fractionator 34. The liquid phase from spray condenser 33 is transferred to a settler 35 from which is withdrawn an upper oil layer and a lower water layer which may be recycled in part by line 36 to the spray condenser 33.

Granular solid is purged by steam admitted at 38 and then transferred by conduit 37 through a depressuring pot 39 to an elevator 40. The discharge from the top of elevator 40 enters a sloping conduit 41 having a classifier 42 and is then admitted to the top of preheater 43 which serves to cool the solid for use in quencher 18. Air for cooling the solid in preheater 43 is supplied by compressor 44 and withdrawn at 45 whence it may be passed directly to heater 10 or conveyed by line 46 to preheater 22 for additional heating. The cooled solids are passed downwardly by feed leg 47 having a steam sealing zone 48 to again enter quencher 18 and be recycled in the system.

The interior structure of the charge contacting vessels is shown in Figures 2 to 4. The structures of the preheaters 22 and 43, the heater 10 and the quencher 18 are generally similar and detailed discussion of quencher 18 will serve for all these elements.

As shown in Figure 2, the reactor 13 comprises a reaction shell 50 within an insulated casing 51. Granular solids from feed leg 11 fall into the steam sealing element 12 and form therein a small heap of granular solids. Steam is admitted above the heap of solids from pipe 52 under a pressure greater than that existing in either the heater or the reactor to thus prevent any mixing of vapors from the elements connected by feed leg 11. From the steam sealing chamber 12 the solids move downwardly through the bottom portion of feed leg 11 into the reactor 13 wherein they fall onto a sloping divider insert 53 and are thereby diverted to the contacting region of the reactor, none of which lies directly below the outlet of feed leg 11. Within the shell 50 the granular solids take the form of a moving bed of granular solids having an upper surface which lies at about the angle of repose about the solids. It may be noted that the flow of gases upwardly through the bed has an effect on the angle of repose of the solids depending upon the gas velocity. As the gas velocity approaches that at which the granular solids would be suspended in the stream of gases, the angle of respose approaches the horizontal. This is an important element in determining how the charge inlets shall be disposed within the bed as will appear hereinafter.

The charge is admitted by the pipes 14 which extend downwardly through the insulated casing 51 and the top of shell 50 to points within the bed of granular solid. The pipes 14 are mounted for vertical movement through stuffing boxes 54 and sealing flanges 55 in the top of shell 50. To obtain uniformity of contact path within the bed of granular solids the several pipes 14 are adjusted to have their lower ends at a constant depth below the upper surface of the bed in shell 50. In the embodiment here shown, the reactor 13 is circular in general outline wherefor the upper surface of dividing insert 53, the upper surface of the moving contact bed and the surface along which the outlets of pipe 14 are arranged are generally conical. It will be readily understood that other outlines may be adapted for reactor 13 in which case these surfaces will be of a different nature.

The bed in reactor 13 is considerably deeper than that necessary to accommodate the contacting zone above the discharge of pipes 14. Some of the heavier hydrocarbons may remain on the granular solid for a substantial distance below the pipes 14 before they become fully vaporized. Any vapors, whether formed instantaneously or substantially below the pipes 14 are caused to pass upwardly through the bed and are brought to maximum temperature in the region above the ends of pipes 14 where the solid has not yet been chilled by direct contact with charge hydrocarbons. A deep bed offers fairly high resistance to the passage of hydrocarbons downwardly, thus encouraging flow of gases through the path of least resistance to the top of the bed. Additionally, provision is made for an inert gas such as steam to sweep upwardly through the bed. This latter result is achieved by injecting steam or the like below a plate 56 through orifices 57 in the wall of the divider insert 53. Steam under pressure somewhat in excess of that prevailing in the contacting zone is admitted to the interior of divider insert 53 by means of pipe 58. The steam pressure inside insert 53 effectively prevents leakage of hydrocarbons to this space thus inhibiting deposition of cokey matter from extensive cracking of hydrocarbons inside the insert. A number of feed pipes 59 depend from plate 56 for the withdrawal of granular solids in a uniform manner across the interior of shell 50. Each one of the pipes 59 withdraws solid from a space diverging upwardly therefrom and the greater the number of these pipes, the less will be the volume of dead spaces wherein the granular solids are not flowing. A plate 60 has orifices 61 spaced so that each of the orifices 61 draws equally from two or more pipes 59 thus equalizing the flow among the pipes 59. The symmetrical arrangement of orifices 61 about the center of shell 50 results in uniform withdrawal from these orifices by outlet pipe 62. As the granular solid flows from the ends of pipes 59 onto plate 60 it assumes the form of a large number of heaps below the free space about the pipes 59. The steam discharged through orifices 57 fills this space and penetrates the heaps to flow upwardly through the pipe 59 thus purging the granular solid as it is withdrawn and producing upward flow of a current of inert gas through the moving bed between plate 56 and the top contacting zone thus insuring that all volatile hydrocarbons shall pass through the high temperature zone at the top of the bed and undergo the desired cracking. This also minimizes the danger of combustible materials being carried from the reactor into the elevator to thus cause a fire hazard.

The space between the insulated casing 51 and the shell 50 is also placed under an inert gas pressure slightly in excess of the pressure in the contacting zone by admitting steam or the like through inlet 27. The pressure of the steam will be such that steam will flow slowly into the casing 50 from the space thereabout through any opening which might permit leakage. The chance that hydrocarbons will seep out into the insulation or to the space about shell 50 is thus effectively overcome.

A manifold for withdrawal of reactant vapors is provided above the bed of contact material by the top wall of shell 50 and a plate 63 having orifices 64 through which the pipes 14 are passed. The orifices 64 act to throttle disengaged vapors rising from the contact bed and thus afford equal flow into the manifold from the various areas above the bed. For example, the orifices 64 may be of such area as to provide a uniform linear velocity of 100 ft. per second through the orifices and the manifold. The manifold is connected to the conduit 17 by a sliding joint comprising a flange 65 at the outlet of the manifold and a collar 66 on an insulated pipe 67 which defines the transfer line between reactor 13 and quencher 18. The water for preliminary quenching may be advantageously admitted at this point, as by means of a spray 68 facing in the direction of vapor flow.

The transfer line between the reactor and the quencher is subject to high thermal stresses and is therefore advantageously mounted and connected in the manner shown. The collar 66 is slidably mounted on the reactor end of pipe 67 and contacts the latter along a relatively small surface such as integral ring 69. A pair of guides 70 mounted on the flange 65 maintain the face of collar 66 in contact with flange 65 along the relatively small area of the raised ring 71. The guides 70 are preferably so formed that they permit some play of the collar 69 from side to side but maintain a fairly firm contact between ring 71 and flange 65. There is thus provided a connection between the manifold and the pipe 67 which permits relative movement of pipe 67 with respect to flange 65 over a considerable distance in any direction without substantial effect upon the nature of the connection. No attempt is made to provide a vapor-tight connection at this point since the steam pressure imposed between shell 50 and casing 51 will prevent the loss of reactant vapors at this point.

In the insulated space between the pipe 67 and a metal wall 72 are disposed a plurality of webs 73 disposed at an angle to the pipe 67 to maintain the spacing between the pipe and the metal wall. The inner ends of these webs are adapted to fit fairly closely to the outer surface of pipe 67 but are not secured thereto, whereby the pipe 67 may slide through the webs under the influence of thermal expansion. The webs are placed at an acute angle to the pipe 67 in order to substantially reduce the temperature differential per unit of length and thus cut down the heat loss by conduction along the webs 73. The webs 73 serve another function in reducing the flow of inert pressuring gas from the space about shell 50 into the quencher 18. The pressure drop through the gap between the end of a web 73 and the pipe 69 is substantial and very little pressuring gas will flow between the pipe 67 and its insulation due to the several high pressure drop gaps thus imposed in its path.

At its end remote from reactor 13, pipe 67 is connected to a manifold 74 for distributing gas in the quencher 18. A plurality of headers 75 extend from each side of the manifold 74 and a plurality of drop pipes 76 depend from each of the headers 75 into a body of relatively cold granular solid in the quencher. Granular solid from the air preheater enters the quencher through feed leg 47 and falls onto a plate 77 from which depend a plurality of feed pipes 78, supplying cold granular solid to the contacting zone below manifold 74. As shown, the contacting zone is enclosed by a shell 79 and an inert pressuring gas such as steam may be admitted by pipe 80 to the space between shell 79 and an insulated casing 81. Quenched reaction products are withdrawn from quencher 18 by an outlet 82 open to the disengaging space among the drop pipes 76 and feed pipes 78.

Uniform flow of solids across the contacting bed in quencher 13 is induced by a number of flow control pipes 83 depending from a plate 84. Purging steam is introduced to the space under plate 84 by pipes 85 communicating with a ring manifold 86 supplied from steam inlet 36. Flow control plates 87 and 88 function to induce equivalent flow through each of the pipes 83 and thus cause the latter to draw equally from all parts of the contacting bed.

As shown, conventional bellows type expansion joints 89 are provided on the granular solid transfer pipes and other places where the same are found desirable.

The thermal strains involved in apparatus of this type are well illustrated by application of this apparatus to the cracking of gas oil to produce ethylene. Circulating granular fused alumina having an average particle diameter of 0.3 inch in both the reaction and quenching cycles, 28.1% by weight of ethylene is produced at a mean effective temperature of 1440° F. and a contact time of 0.29 second. The granular solid is heated to 1575° F. in the heater and enters the reactor at 1546° F. A mixture of 33% steam and 67% gas oil (by weight) is admitted to the reactor at 625° F. with a space velocity of 3.12 volumes of liquid oil at 60° F. per volume of reaction space per hour. A granular solid to oil weight ratio of 11.95 is maintained, using a zone of contact 24 inches deep. The heated reaction mixture is disengaged from the solid bed at 1545° F. and quenched with water to 1200° F., at which temperature it is transferred to the quencher and further cooled therein to 572° F. The quenched reaction mixture is further cooled in the spray condenser to 100° F. and is then treated for recovery of the products of the reaction. Among the liquid by-products are 5.5% of depentanized motor gasoline having an end point of 416° F. and an octane number of 94.6 with 3 cc. of tetraethyl lead per gallon.

I claim:

The process which comprises passing a mass of granular solid downwardly through a heating zone, a reaction zone and a high temperature air preheating zone in series as a compact moving bed in each of said zones, passing a second mass of granular solid downwardly through a low temperature preheating zone and a quenching zone in series as a compact moving bed in each of said two last named zones, passing a gaseous hydrocarbon in direct contact with said solid in said reaction and said quenching zone, passing air in direct contact with said solid in said low temperature preheating zone and said high temperature preheating zone in series, burning fuel in the air so preheated by contact with said solid in said preheating zones, passing the resultant products of combustion in direct contact with said solid in said heating zone, returning said solid from the bottom of said high temperature preheating zone to the top of said heating zone, and returning said solid from the bottom of said quenching zone to the top of said low temperature preheating zone.

ERIC V. BERGSTROM.

REFERENCES CITED

The following references are of record in the file of this patent:

UNITED STATES PATENTS

| Number | Name | Date |
|---|---|---|
| 2,387,378 | Wolk | Oct. 23, 194 |
| 2,399,450 | Ramseyer I | Apr. 30, 194 |
| 2,396,709 | Leffer | Mar. 19, 194 |
| 2,389,636 | Ramseyer II | Nov. 27, 194 |